Patented Oct. 31, 1944

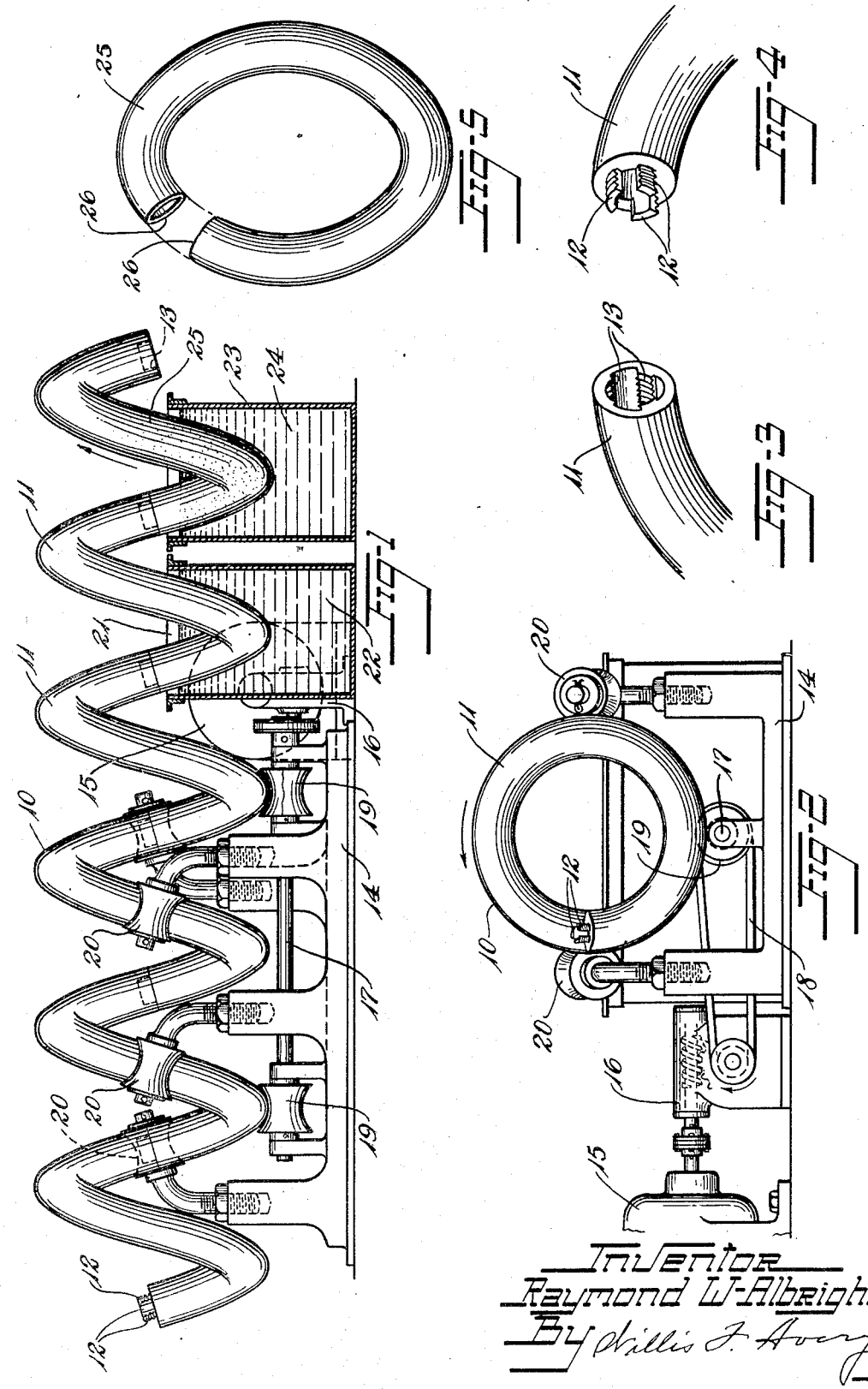

2,361,583

UNITED STATES PATENT OFFICE 2,361,583

METHOD AND APPARATUS FOR MANUFACTURING ARTICLES FROM LIQUID COATING COMPOSITIONS

Raymond W. Albright, Akron, Ohio, assignor to American Anode Inc., Akron, Ohio, a corporation of Delaware Application February 1, 1943, Serial No. 474,374

21 Claims. (Cl. 18—41)

This invention relates to a method and apparatus for manufacturing articles from liquid coating compositions, and particularly relates to the manufacture of articles of rubber tubing, such as inner tubes for vehicle tires, from latex or similar aqueous dispersions of rubbery materials.

It is an object of this invention to provide a method of making tubular articles from liquid coating compositions in an inexpensive and efficient manner. It is also an object of this invention to provide novel apparatus for making such articles. It is more particularly an object of this invention to provide a method and apparatus for making articles of rubber tubing, such as inner tubes for vehicle tires, from latex or similar aqueous dispersions of rubbery materials in a continuous process. Other objects of the invention will be apparent in the following detailed description of the invention.

Broadly, this invention comprises providing a helical mandrel and progressively coating successive localized areas of the mandrel by causing it to move in a screw-like manner through the coating material. In a specific embodiment of the invention there is provided a container for the liquid coating material so arranged that the material will normally be in contact with a localized area of the helical mandrel. There is also provided in this specific embodiment rotating means so constructed and arranged as, simultaneously, to rotate the mandrel and to propel it laterally through the body of liquid coating material. It is recommended, wherever the nature of the manufactured product permits, that the mandrel be constructed of sections detachably secured together. Then when one section has been coated with the coating material it may be detached, the coating removed, and the mandrel section transported to the opposite end of the mandrel and secured to the last section. By this means the process may be made continuous.

This invention can best be understood by reference to the accompanying drawing which illustrates an embodiment of the invention designed for making inner tubes for pneumatic tires. In the drawing Fig. 1 is an elevation of an apparatus for making tire inner tubes by the method of this invention;

Fig. 2 is an end view of the apparatus of Fig. 1;

Fig. 3 is a fragmentary perspective view of one end of a mandrel section illustrating the female portion of a breech type lock;

Fig. 4 is a similar view of the opposite end of a mandrel section illustrating the corresponding male portion of the breech type lock; and Fig. 5 is an elevation of a rubber tube after it has been stripped from a mandrel section.

In the illustrated embodiment of the invention for making inner tubes for pneumatic tires there is provided a helical mandrel 10 (Fig. 1) comprising 360° helical sections 11, 11 detachably secured together as by means of a breech-lock type securing means comprising three threaded projections 12, 12 on one mandrel section and three mating recesses 13, 13 similarly threaded on another mandrel section. Each mandrel section 11 will include projections 12, 12 on one end and recesses 13, 13 on the opposite end. With this type of securing means it is possible to secure the sections together rapidly, and, likewise, to take them apart rapidly.

The apparatus illustrated also comprises a base 14, a motor 15, a gear reducer 16 connected to the motor, and a drive shaft 17 mounted on the base 14 and driven by the gear reducer by means of pulleys and a belt 18. The drive shaft 17 drives two wheels 19, 19 having curved surfaces that are preferably coated with rubber for frictional engagement with the mandrel. The helical mandrel 10 rests on these wheels 19, 19 so that it can be rotated by the wheels. In order to hold the mandrel in position there are also provided on each side of the apparatus a number of idler wheels 20, 20 having surfaces curved similarly to the drive wheels 19, 19 and which desirably engage the mandrel at positions above the level of the drive wheels 19, 19, so as to provide stability sidewise.

As may be seen from the accompanying drawing, the helical mandrel has the form of a large screw which, when rotated by means of driving wheels 19, 19, will be propelled laterally, either forward or backward depending upon the direction of rotation. In the example shown in Fig. 1 the mandrel is rotated so that it progresses from left to right, or, as it may be considered, the mandrel is propelled forwardly. For coating the mandrel with latex there is provided on the right, or forward, end a container 23 of latex 24. The container is so arranged that a localized, lower, area of the mandrel is immersed in the container. A container 21 of latex coagulant 22 may be similarly arranged so as to precede the latex. Desirably, the containers are so arranged that substantially the lower halves of two successive mandrel loops are immersed in the respective coating materials, as illustrated.

In making inner tubes the apparatus is arranged as shown in the drawing and the helical mandrel is simultaneously rotated and propelled forward by means of driving wheels 19, 19. A given area of the mandrel enters the coagulant 22, progresses out of the coagulant and into the latex 24. Here it receives an overall coating of latex rubber. After a complete section 11 of the mandrel is covered with latex rubber it is removed from the rest of the mandrel by cutting the rubber deposit at the point of connection between the mandrel sections, and unlocking the mandrel section from the rest of the mandrel. The rubber covering on the mandrel is then washed, at least partially dried, and then removed from the mandrel section. This mandrel section is carried to the rear of the helical deposition mandrel and re-attached thereto. The rubber deposit 25 is formed into an endless tube as by cementing the ends 26, 26 together. As the sections of the mandrel are easily and rapidly separated and secured together there need be no stopping of the machine when the rubber coated sections are taken apart at the front of the mandrel and then re-attached at the rear of the mandrel. This, of course, makes the method continuous and because the structure is so simple the entire method is practically trouble proof.

In handling the rubber covered mandrel sections and removing them from the rest of the mandrel some mutilation of the rubber may occur near the ends of the sections. For this reason it is preferred that each section be somewhat longer than the circumference of the finished rubber tube. This is desirable so that there will be room for trimming the ends of the rubber tube before they are joined together.

The rubber deposited on the helical mandrel is vulcanized in the usual manner, as by heating in steam, hot water or hot air. If the tube walls are thick enough to at least partially support themselves this vulcanization is preferably done after the deposit is removed from the mandrel section and the ends joined together. If, however, it is desired, the rubber deposit may be vulcanized on the mandrel section, then stripped off, and the ends then joined together. All this is well understood in the art. In making articles longer than inner tubes, it may be desirable to dry and even to vulcanize the rubber on the mandrel and without first detaching the sections. This may be accomplished by providing heated ovens or the like adjacent the forward end of the apparatus and causing the coated mandrel to progress, in the same screw-like fashion, through the ovens. Supporting wheels may be provided after the rubber coating has dried substantially.

The speed of rotation of the helical mandrel depends upon the thickness of the deposit desired, and the depth to which the mandrel is immersed in the liquid coating material, as well as the characteristics of the liquid coating compositions. In general it may be said that when a rubber inner tube for a 6.00 x 16 tire is made from ordinary concentrated and compounded latex of commerce, the speed of rotation will be about three revolutions per hour, using a typical commercial coagulant composition of the character hereinafter indicated. This is true when the helical mandrel is immersed about half of its circumference in the latex. The coagulant 22 may be any of those well-known latex coagulants and is preferably a solution of a poly-valent metal salt in a volatile solvent. In the embodiment illustrated the coagulant may be a 10% solution of zinc chloride in water.

Although the illustrated embodiment of this invention shows the container of latex in fixed position and the helical mandrel propelled through the latex it is also within the scope of this invention to merely revolve the mandrel in fixed position and to move the containers of coagulant and latex in timed relation with the rotating mandrel so that the liquid coating containers progress along the mandrel, much as in the case of a lathe screw drive. In some instances such procedure may be preferred as, for example, when the helical mandrel is in one continuous piece and it is desired to deposit rubber over the entire mandrel before the rubber deposit is stripped off. Other known deposition methods may be substituted for the preferred coagulant deposition described. All such modifications are within the scope of this invention unless otherwise specifically indicated.

The liquid coating materials used in this invention may be any of the liquids that are adaptable for coating, including cellulose compositions, rubber cement, and the like as well as latex and other natural or artificial dispersions of rubber and rubbery materials, whether natural or synthetic. If the coating material is vulcanizable, it may be pre-vulcanized or it may contain any of the usual vulcanizing ingredients, and all such coating materials may contain any of the usual compounding ingredients that may be desired.

Although the invention has been described in considerable detail as to specific features of a typical embodiment of the invention and with reference to proposed specific materials to be used, it should be understood that I do not intend to limit the invention to these features but rather my desire is that the invention be construed broadly within its spirit and scope as set out in the accompanying claims.

I claim:

1. The method of making articles from liquid coating materials which comprises progressively coating localized areas of a helical mandrel body with the coating material by causing the mandrel body to progress in a screw-like manner through a body of the coating material, the progress of the mandrel body through the body of coating material being effected by rotating the mandrel body about a longitudinal axis thereof and simultaneously effecting between the two said bodies a relative movement of translation in the general direction of said axis.

2. The method of making articles from liquid coating materials which comprises detachably securing together in end to end relation a plurality of helical mandrel sections to provide a helical mandrel body, progressively coating localized areas of said mandrel body with the coating material by causing the mandrel body to progress in a screw-like manner through a body of the coating material, the progress of the mandrel body through the body of coating material being effected by rotating the mandrel body about a longitudinal axis thereof and simultaneously effecting between the two said bodies a relative movement of translation in the general direction of said axis, and thereafter detaching the coated mandrel sections.

3. The method of making articles from latex which comprises detachably securing together in end to end relation a plurality of helical mandrel sections of substantially circular cross-section to provide a helical mandrel body, arranging the mandrel body in substantially horizontal position, and progressively coating successive localized areas of said mandrel body with latex by causing the mandrel body to progress in a screw-like manner through a body of latex, the progress of the mandrel body through the body of latex being effected by rotating the mandrel body about a longitudinal axis thereof and simultaneously effecting between the two said bodies a relative movement of translation in the general direction of said axis.

4. The method of making rubber inner tubes for pneumatic tires which comprises providing a helical mandrel of substantially circular cross-section comprising a plurality of substantially 360° sections detachably secured together in end to end relation, arranging the mandrel in a substantially horizontal position, progressively coating successive localized areas of said mandrel with latex by moving the mandrel in a screw-like manner about its axis and through a body of latex, severing the deposited rubber at the areas of intersection of the mandrel sections, separating the sections of the mandrel, removing the rubber deposits, and joining the ends of the several deposits to make endless tubes.

5. Apparatus for making articles from liquid coating materials, said apparatus comprising a helical mandrel, a container for the liquid coating material so arranged that the material will normally be in contact with a localized area of the helical mandrel, and means for causing the mandrel to progress in a screw-like manner laterally through the liquid coating material by rotating the mandrel about a longitudinal axis thereof and simultaneously effecting between the mandrel and the container a relative movement of translation in the general direction of the said axis.

6. Apparatus for making articles from liquid coating materials, said apparatus comprising a helical mandrel comprising a plurality of sections detachably secured together in end to end relation, a container for the liquid coating material so arranged that the material will normally be in contact with a localized area of the helical mandrel, and means for causing the mandrel to progress in a screw-like manner laterally through the liquid coating material by rotating the mandrel about a longitudinal axis thereof and simultaneously effecting between the mandrel and the container a relative movement of translation in the general direction of the said axis.

7. Apparatus for making articles from liquid coating materials, said apparatus comprising a helical mandrel, a container for the liquid coating material so arranged that the material will normally be in contact with a localized area of the mandrel, and mandrel supporting and driving means so constructed and arranged as to rotate the mandrel about a longitudinal axis and simultaneously to propel it bodily in the general direction of said axis and thereby to cause the mandrel to progress in a screw-like manner through the liquid coating material.

8. Apparatus for making articles from liquid coating materials, said apparatus comprising a helical mandrel comprising a plurality of sections detachably secured together in end to end relation, a container for the liquid coating material so arranged that the material will normally be in contact with a localized area of the mandrel, and mandrel supporting and driving means so constructed and arranged as to rotate the mandrel about a longitudinal axis thereof and simultaneously to propel it bodily in the general direction of said axis and thereby to cause the mandrel to progress in a screw-like manner through the liquid coating material.

9. Apparatus for making inner tubes for pneumatic tires from latex, said apparatus comprising a helical mandrel comprising a plurality of substantially 360° sections detachably secured together in end to end relation to form a relatively long helix, a container for the latex so arranged that the latex will normally be in contact with a localized area of the mandrel, and mandrel supporting and driving means so constructed and arranged as to rotate the mandrel about a longitudinal axis thereof and simultaneously to propel it bodily in the general direction of said axis and thereby to cause the mandrel to progress in a screw-like manner through the latex.

10. Apparatus for making inner tubes for pneumatic tires from latex, said apparatus comprising a helical mandrel arranged in substantially horizontal position and comprising a plurality of substantially 360° sections secured together, in end to end relation, a container for the latex so arranged that the latex will normally be in contact with a localized area of the mandrel, and mandrel supporting and driving means so constructed and arranged as to rotate the mandrel about a longitudinal axis thereof and simultaneously to propel it bodily in the general direction of said axis and thereby to cause the mandrel to progress in a screw-like manner through the latex.

11. Apparatus for making tubular articles from coagulable aqueous dispersions of coating materials, said apparatus comprising a container for the coagulable dispersion, a container for a coagulant, a helical mandrel, means for supporting the mandrel with separate localized portions thereof immersed respectively in the two containers, and means for rotating the mandrel and causing it to progress through the two containers in a screw-like fashion.

12. Apparatus for making tubular articles from liquid coating materials, said apparatus comprising a helical mandrel, means for causing the mandrel to rotate about a longitudinal axis thereof, a container for the coating material so arranged with respect to the mandrel as to immerse at least a portion of the mandrel in the container, and means for effecting relative translational movement between the mandrel and the container in the general direction of the said axis so that the mandrel progresses through the coating material in a screw-like fashion.

13. The method which comprises immersing a portion of a helical mandrel body in a body of liquid material, and rotating the helical body about a longitudinal axis thereof while advancing one of said bodies with respect to the other in the general direction of said axis, thereby immersing successive longitudinal portions of the mandrel body in the liquid material.

14. The method which comprises immersing a portion of a helical mandrel body in a body of liquid material, and rotating the mandrel body about a longitudinal axis thereof while progressively advancing it transversely with respect to the body of liquid material, thereby immersing successive longitudinal portions of the mandrel body in the liquid material.

15. The method which comprises coupling a plurality of helical sections to provide a helical body, immersing a portion of the helical body in a body of liquid material, rotating the helical body about a longitudinal axis thereof while advancing one of said bodies with respect to the other in the general direction of said axis, thereby to immerse successive longitudinal portions of the helical body in the liquid material, and thereafter uncoupling helical sections which have been immersed in the liquid material.

16. The method which comprises immersing a portion of a helical mandrel body in a body of a coagulable liquid coating material, immersing a different portion of the mandrel body in a body of a liquid coagulant for the coating material, and rotating the helical mandrel body about a longitudinal axis thereof while effecting between the helical mandrel body and the two liquid bodies a relative movement of translation in the general direction of said axis and thereby causing successive longitudinal portions of the mandrel to progress through the two liquid bodies in a screw-like manner.

17. Apparatus of the character described comprising a helical body, a container body for liquid material arranged so that a portion of the helical body is immersed in the container body, and means for rotating the helical body about a longitudinal axis thereof and for simultaneously advancing one of said bodies with respect to the other so that successive longitudinal portions of the helical body are immersed in the container body.

18. Apparatus of the character described comprising a helical body having several helical convolutions, means engaging some of said convolutions and supporting the helical body in a generally horizontal position while leaving at least one helical convolution unsupported, a container for liquid material arranged so as to immerse a portion of said unsupported convolution in the container, and means for rotating the helical body about its longitudinal axis and for simultaneously advancing it bodily with respect to the container and along said axis so as to cause successive longitudinal portions of the helical body to progress through the container in a screw-like fashion.

19. Apparatus of the character described comprising a helical body having several helical convolutions, means supporting said helical body in a generally horizontal position while leaving at least one helical convolution without direct support, a container for liquid material arranged so as to immerse a portion of the unsupported convolution in the container, and driving means frictionally engaging the surface of said helical body for imparting thereto a combined movement of rotation about its longitudinal axis and translation along said axis.

20. Apparatus of the character described comprising a helical body having several helical convolutions, a container for liquid material, means supporting the helical body with at least one of said convolutions partially immersed in the liquid material in the container while other convolutions are entirely outside the container, and means for causing the helical body to advance with respect to the container in a screw-like fashion and thereby to bring successive longitudinal portions of the helical body into the container.

21. The method of coating a helical body which comprises immersing at least one convolution of a helical body in a body of liquid coating material while other convolutions thereof remain entirely outside the liquid body and then immersing successive longitudinal portions of the helical body in the liquid by causing the helical body to progress through the liquid in a screw-like manner.

RAYMOND W. ALBRIGHT.